(12) United States Patent
Gooch (10) Patent No.: US 7,206,904 B2
(45) Date of Patent: Apr. 17, 2007

(54) METHOD AND SYSTEM FOR BUFFERING MULTIPLE REQUESTS FROM MULTIPLE DEVICES TO A MEMORY

(75) Inventor: Mark Gooch, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 10/102,990

(22) Filed: Mar. 20, 2002

(65) Prior Publication Data

US 2003/0182517 A1   Sep. 25, 2003

(51) Int. Cl.
*G06F 13/00* (2006.01)

(52) U.S. Cl. ............... 711/150; 711/149; 711/168; 711/219

(58) Field of Classification Search ........ 711/149–150, 711/219, 168
See application file for complete search history.

(56) References Cited

U.S. PATENT DOCUMENTS

| | | | | |
|---|---|---|---|---|
| 4,866,609 A | * | 9/1989 | Calta et al. ................. 710/54 |
| 5,202,856 A | * | 4/1993 | Glider et al. ........... 365/230.05 |
| 5,203,002 A | * | 4/1993 | Wetzel ....................... 712/21 |
| 5,375,215 A | * | 12/1994 | Hanawa et al. ............. 711/169 |
| 5,608,891 A | * | 3/1997 | Mizuno et al. ............. 711/114 |
| 5,835,962 A | * | 11/1998 | Chang et al. ............... 711/206 |
| 5,978,897 A | * | 11/1999 | Nakagawa ................. 712/200 |
| 6,282,144 B1 | * | 8/2001 | Batson et al. .......... 365/230.05 |
| 6,282,505 B1 | * | 8/2001 | Hanawa et al. ............... 703/25 |
| 6,321,284 B1 | * | 11/2001 | Shinohara et al. .......... 710/113 |
| 6,654,308 B1 | * | 11/2003 | Carter ................... 365/230.05 |
| 2001/0044882 A1 | * | 11/2001 | Pille et al. ................. 711/149 |

* cited by examiner

*Primary Examiner*—Matthew Kim
*Assistant Examiner*—Hetul Patel (57) ABSTRACT

A system for sharing a computational resource by buffering multiple requests from multiple devices to a memory (e.g. a multi-port RAM or FIFO) in a single clock cycle. The system includes a memory having a first write port and a second write port. A first request input is coupled to the first write port. A second request input is coupled to the second write port. A controller is coupled to the memory. The controller is configured to control the memory to store a first request into the memory via the first write port and a second request into the memory via the second write port. The first and second requests are received via the first and second request inputs and stored into the memory in one clock cycle. Requests are removed from the memory sequentially at a rate that is determined by the shared computational resource.

22 Claims, 7 Drawing Sheets

```
WE1 = 0;
WE2 = 0;
if   (R_ptr == w_ptr)
     (
     EMPTY = 1;
     )
else
     (
     EMPTY = 0;
     )
if   (W1 & !W2)
     (
     W_ADDR1 = W_ptr;
     WE1 = 1;
     W_ptr = W_ptr + 1;
     )
if   (!W1 & W2)
     (
     W_ADDR2 = W_ptr;
     WE2 = 1;
     W_ptr = W_ptr + 1;
     )
if   (W1 & W2)
     (
     W_ADDR1 = W_ptr;
     WE1 = 1;
     W_ADDR2 = W_ptr + 1;
     WE2 = 1;
     W_ptr = W_ptr + 2;
     )
if   (TAKEN & !EMPTY)
     (
     R_ptr = R_ptr + 1;
     )
R_ADDR = R_ptr;
```

```
if   (R_ptr == W_ptr)
     (
     EMPTY = 1;
     )
else
     (
     EMPTY = 0;
     )
for  (I=0; I<x, I=I+1)
     (
     SELECT[I] = 2'b10;
     )
if   (W1 & !W2)
     (
     SELECT[W_ptr] = 2'b00;
     W_ptr = W_ptr + 1;
     )
if   (!W1 & W2)
     (
     SELECT[W_ptr] = 2'b01;
     W_ptr = W_ptr + 1;
     )
if   (W1 & W2)
     (
     SELECT[W_ptr] = 2'b00;
     SELECT[W_ptr + 1] = 2'b01;
     W_ptr = W_ptr + 2;
     )
if   (TAKEN & !EMPTY)
     (
     R_ptr = R_ptr + 1;
     )
```

Figure 7

METHOD AND SYSTEM FOR BUFFERING MULTIPLE REQUESTS FROM MULTIPLE DEVICES TO A MEMORY

TECHNICAL FIELD

The present invention pertains to the field of digital systems. More particularly, the present invention relates to the optimization of access to a shared computational resource by multiple devices operating in parallel with each other.

BACKGROUND ART

Digital electronic devices often rely on shared access to a single computational resource, for example a mathematical calculation unit (e.g. to calculate trigonometric functions, perform fast multiplication, etc.), a search algorithm (e.g. a special purpose hash function, a binary tree search, etc.), and the like. The main reasons for relying on a shared resource are that it is generally too expensive to duplicate a complex resource, and even if such duplication is possible this may in itself cause coherency issues, especially if multiple devices attempt to update a resource at the same time (e.g. deadlock issues, stale data, etc.).

In a typical digital electronic device, access to a shared resource is via a common bus, which is managed by a set of bus protocols. These protocols regulate when data (in the form of a service request) can be written to the resource, and provide an acknowledgement of the request once it has been accepted. There exists a problem however, when multiple devices require very fast access to a single computational resource.

Some digital electronic devices include multiple digital components which require fast efficient access to a shared resource. In this situation, the standard prior art bus protocol schemes are often inadequate. Such schemes typically prioritize requests and make one or more devices wait until a first access is completed by a first device.

Other digital electronic devices are specifically designed to perform digital processing operations in parallel by using parallel execution units. In many instances, it is advantageous that such units share a single resource in order to access a common function, operation or data structure. Prior art protocol schemes would defeat the objective of performing digital processing operations in parallel. Prior art bus protocol and access schemes to a shared resource would have access by the requesters to the shared resource occur serially, with one access blocking other accesses until it completes.

Thus, there exists a problem with respect to the sharing of a single resource between multiple accessers (or requesters). Provided the shared resource has sufficient bandwidth to handle multiple requests from multiple devices within a given time frame, it is desirable that requesters are not stalled waiting for the single resource to fulfill a request. The reason for this is that it is likely that the requesters have other operations to perform, and it is inefficient to stall a requester while it waits for its request to be accepted (which may take a number of clock cycles, depending on the number of other instantaneous requesters). It is even more inefficient to stall a requester while it waits for a result from the resource (which may take many clock cycles). These conditions regularly arise when the requesters are asynchronous, such that each requester can generate a request at any time.

One prior art solution to the problem is to implement a buffer, for example a FIFO, on the input to the shared resource such that requests are temporarily held until they can be processed. However, if the buffer can only accept one request per clock cycle, then the system is still forced to use an arbitration process and an acknowledgement protocol from the resource to each requester, which may again result in the stalling of requesters until the request can be stored in the buffer. This solution also adds additional complexity to each requester.

Thus the prior art is problematic in that systems are often constrained in situations where parallel execution units require access to a shared resource. Additionally, the prior art is problematic in that even when requests from multiple devices are buffered, such requests can only be buffered one at a time, still forcing the multiple devices to wait their turn as requests from other devices are buffered. Both of these situations act to unnecessarily stall requesters, thus causing system inefficiencies.

DISCLOSURE OF THE INVENTION

A method and system for buffering multiple requests from multiple devices to a memory in a single clock cycle is disclosed. The system includes a memory having a first write port and a second write port. A first request input is coupled to the first write port. A second request input is coupled to the second write port. A controller is coupled to the memory. The controller is configured to control the memory to store a first request into the memory via the first write port and a second request into the memory via the second write port. The first and second requests are received via the first and second request inputs. The first and second requests are stored into the memory in one clock cycle.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

A method and system for buffering multiple requests from multiple devices to a shared buffer memory (e.g. a multi-write port RAM or FIFO) in a single clock cycle is disclosed. In one embodiment, the present invention is implemented as a system including a multi-port memory having at least two write ports (e.g., a first write port and a second write port). A first request input is coupled to the first write port. A second request input is coupled to the second write port. A controller is coupled to the buffer memory and is configured to store a first request into the buffer memory via the first write port and a second request into the buffer memory via the second write port, such that the first and second requests are stored in one clock cycle. In so doing, the system can buffer multiple requests from multiple devices to the buffer memory in a single clock cycle, thereby providing access to a shared resource without constraints such as arbitration or bus limitations. Additionally, the system can implement multiple requests in parallel, as in a case where parallel execution units require access to a shared resource. Also embodiments of the present invention are flexible in that they permit many different combinations of multiple requests and/or multiple devices (e.g., device 1 may be capable of generating only a single request, device 2 may be capable of generating 2 simultaneous requests, etc.).

Figure 1:
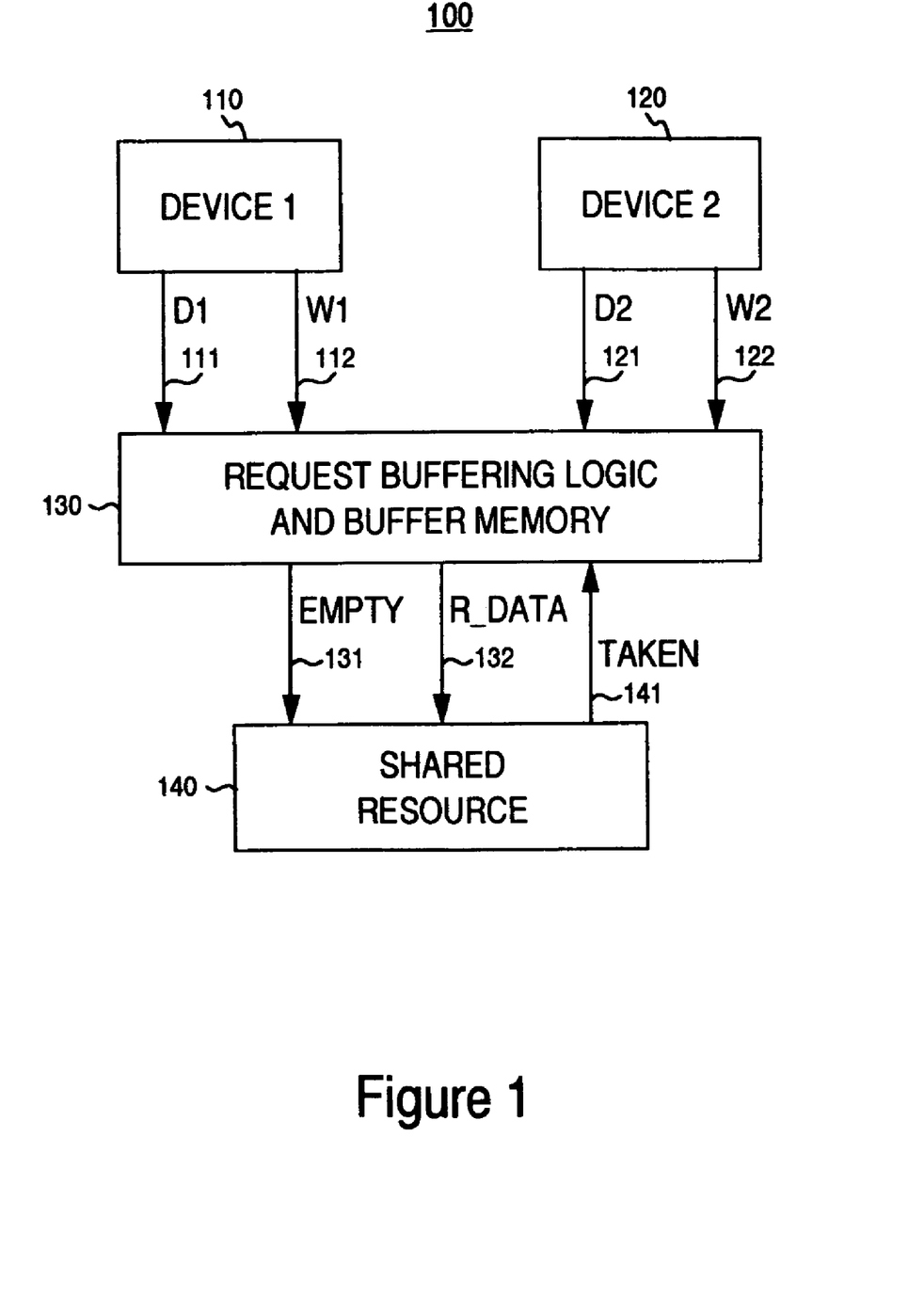
FIG. 1 shows a multiple request buffering system in accordance with one embodiment of the present invention.

FIG. 1 shows a system 100 in accordance with one embodiment of the present invention. As depicted in FIG. 1, system 100 includes a first device 110 and a second device 120, both requiring access to a shared resource 140. The request buffering logic and buffer memory 130 acts as an interface between the multiple devices 110 and 120 and the shared computational resource 140. Each device has a data bus and write signal (e.g. D1 111 and W1 112 for device 110, and D2 121 and W2 122 for device 120) to transfer the data for a request. The EMPTY signal 131 indicates that no requests are currently queued. If a request is available, it is passed to the shared computation resource 140 via the request databus R_DATA 132. The shared resource 140 generates a TAKEN signal 141 to indicate that it has taken the current request data from the request buffering logic and buffer memory 130, and is ready for the next request data. Thus system 100 of the present embodiment functions by buffering multiple requests from multiple devices to access a shared resource 140 in a single clock cycle.

Figure 2:
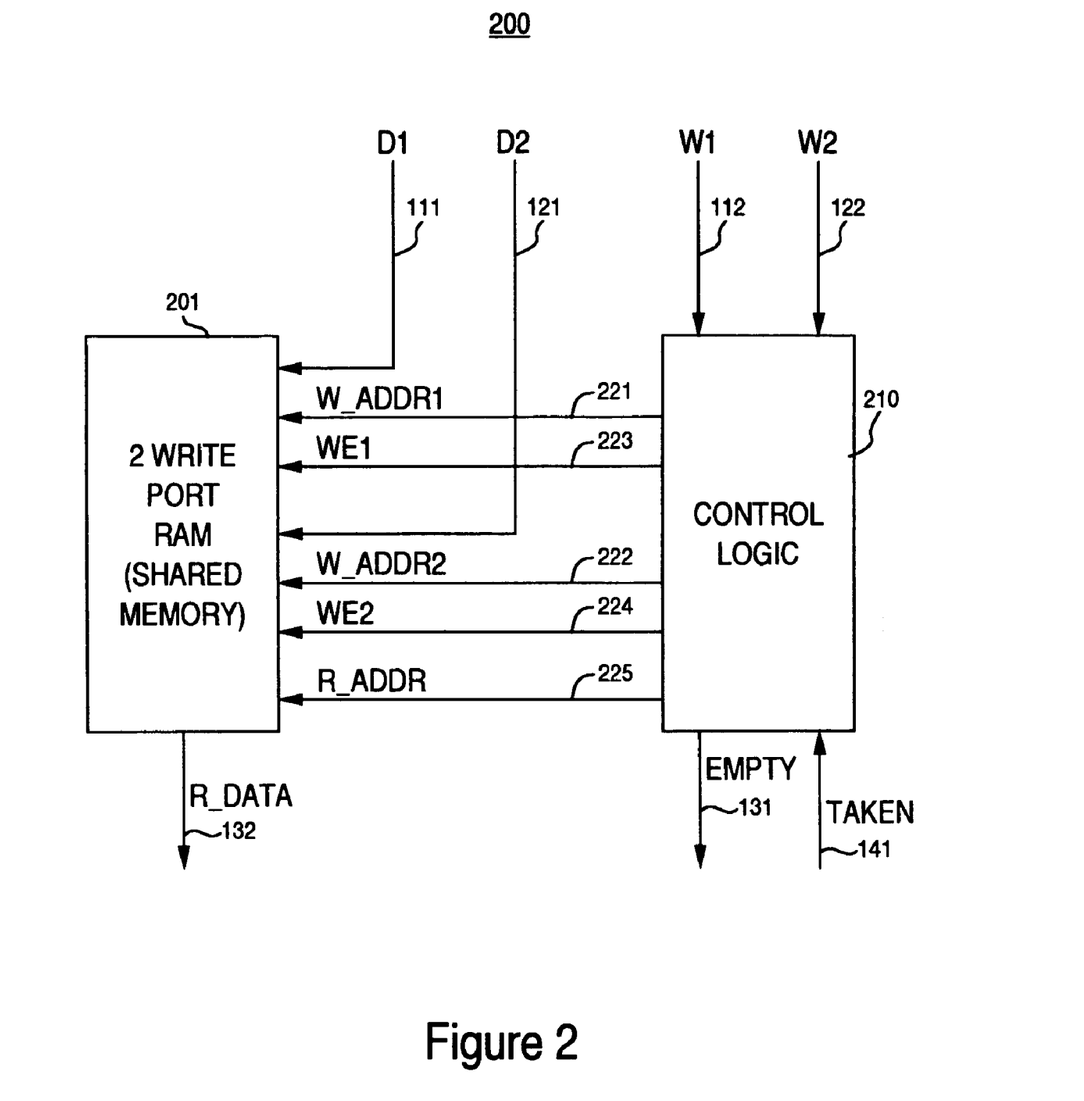
FIG. 2 shows one implementation of the multiple request buffering logic and buffer memory shown in FIG. 1.

FIG. 2 shows a system 200 in accordance with one embodiment of the request buffering logic and buffer memory 130 of FIG. 1. As depicted in FIG. 2, system 200 includes a 2-write port RAM 201 coupled to a controller 210. The RAM includes first and second write address lines 221–222 for communicating a first write address input and a second write address input. The Ram also includes a first and second write enable lines 223–224 coupled to the controller 210. A first write port is coupled to first request input D1 111 and a second write port is coupled to first second request input D2 121. Write assert lines W1 112 and W2 122 are shown connected to the control logic 210.

System 200 of the present embodiment functions by buffering multiple requests from multiple devices to access a shared resource in a single clock cycle. To accommodate two simultaneous requests, RAM 201 has two write ports operating in conjunction with the address lines 221–222 and the write enable lines 223–224. A first request input, in this case D1 111, receives requests from, for example, a first device. Similarly, a second request input, in this case D2 121, receives requests from, for example, a second device. The request inputs are buffered by storing them into the RAM 201. In accordance with present invention, this is accomplished during a single clock cycle.

The control logic 210 is coupled to receive the write assertions 112 and 122. By controlling the address lines 221–222 and the write enable lines 223–224, the controller manages the RAM 201 to store the multiple requests into their proper locations within the RAM 201.

Thus, system 200 of the present embodiment can buffer multiple requests from multiple devices to the memory 201 in a single clock cycle, thereby implementing access to a shared resource without being constrained by arbitration or bus limitations. It should be noted that the access is provided without requiring one request or the other to be temporarily held (e.g., wait state, etc.). Even though two requests may arrive in a single clock cycle, both requests can be buffered simultaneously by being stored within the RAM 201. In this manner, system 200 prevents the stalling of requesters. By allowing the RAM 201 to accept multiple requests in a single clock cycle, system 200 obviates the need for any acknowledgement protocol.

Figure 3:
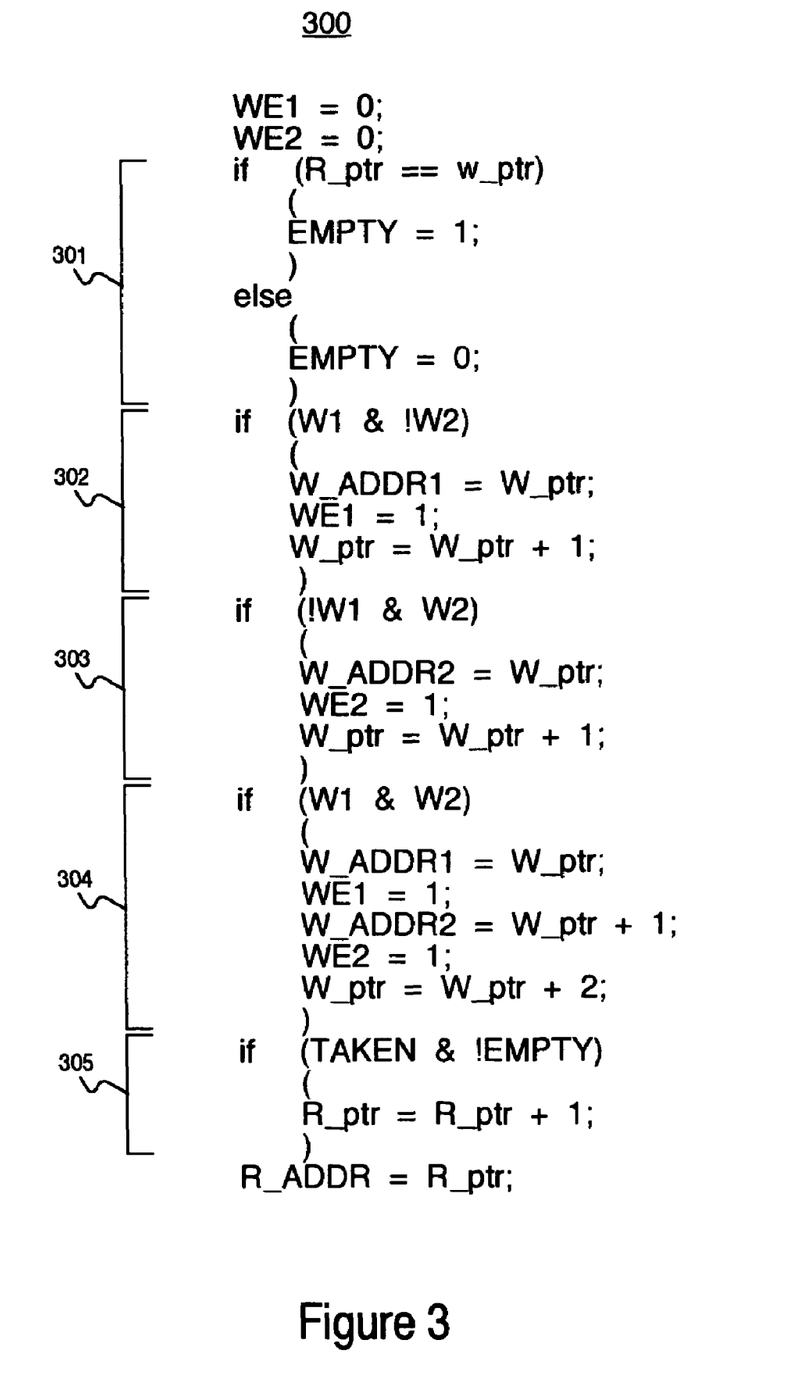
FIG. 3 shows a generalized pseudo-code representation of a multiple request buffering process as implemented by the control logic shown in FIG. 2.

FIG. 3 shows a generalized pseudo-code representation 300 of a multiple request buffering process as implemented by the control logic 210 of system 200. Representation 300 shows a case where two requesting devices have their respective requests buffered within a shared memory 201.

The pseudo-code representation 300 begins with the initialization of the write enable lines (e.g., shown as WE1 and WE2) to zero. The bracket 301 shows the determination of whether the RAM 201 is storing any requests. This is achieved by comparing the current value of the write pointer W_ptr with that of the read pointer R_ptr. If the two pointers are equal, then there are no requests stored in the RAM and hence the EMPTY signal is set to 1, otherwise it is set to 0. The bracket 302 shows a case where a request is received from a first device and not from a second device. In this case, the write address for the first device, W_ADDR1, is assigned to be the write pointer, the request is written to the memory, and the write pointer is incremented by one. The bracket 303 shows a case where the request is received from the second device and not from the first device. In this case, the write address for the second device, W_ADDR2, is assigned to be the write pointer, the request is written to the memory, and the write pointer is incremented by one. The bracket 304 shows a case where the requests are received from both the first device and the second device. In this case, the write address for the first device is assigned to be the write pointer, the request is written, the write address for the second device is assigned to be the write pointer plus one, the request is written, and then the write pointer is subsequently incremented by two. The read pointer R_ptr is incremented whenever a request is taken by the shared resource and the buffer memory is not empty, as shown in bracket 305. The read address to the buffer memory R_ADDR is always identical to the read pointer R_ptr. It should be noted that process 300 will complete within a single clock cycle.

Thus, the pseudo-code representation 300 shows a case where the data for the two requests are inserted into respective memory locations within the buffer memory 201. In this case, where both requests are active in the same clock cycle, the pseudo-code representation 300 shows the first request of a first device (e.g., WE1) being written into a memory location before the second request from the second device (e.g., WE2). It should be noted however that the order can be reversed. The order in which requests are written into the buffer memory 201 can also be based on some form of prioritization, for example, as required by some particular need of the user. In addition, this prioritization can also occur dynamically, for example by having each requesting device supply a priority to the controller with each request that is generated.

Referring still to the pseudo-code of FIG. 3, controller 210 is configured to implement simultaneous access to the memory 201 by utilizing a single write pointer W_PTR. Such a solution may not be adequate with either a very fast or very deep memory 201, in which case it is desirable to implement one write pointer for each device that can write a request to the buffer memory. In this situation, multiple write pointers would be maintained that are offset by 1 from each other, e.g. W_ptr_plus_one=W_ptr+1, W_ptr_plus_two=W_ptr+2, etc. This allows higher speed operation by removing the pointer addition operation from the critical path of generating the write addresses (e.g. W_ADDR1, W_ADDR2, etc) to the memory 201.

It should be noted that in general, a hardware implementation of the pseudo-code representation 300 requires control logic to examine the input write enable signals and generate the appropriate write control signals for the memory. As such, the configuration of the control logic depends on the particular structure of the memory implemented (e.g. number of write ports, different latencies, etc.).

Figure 4:
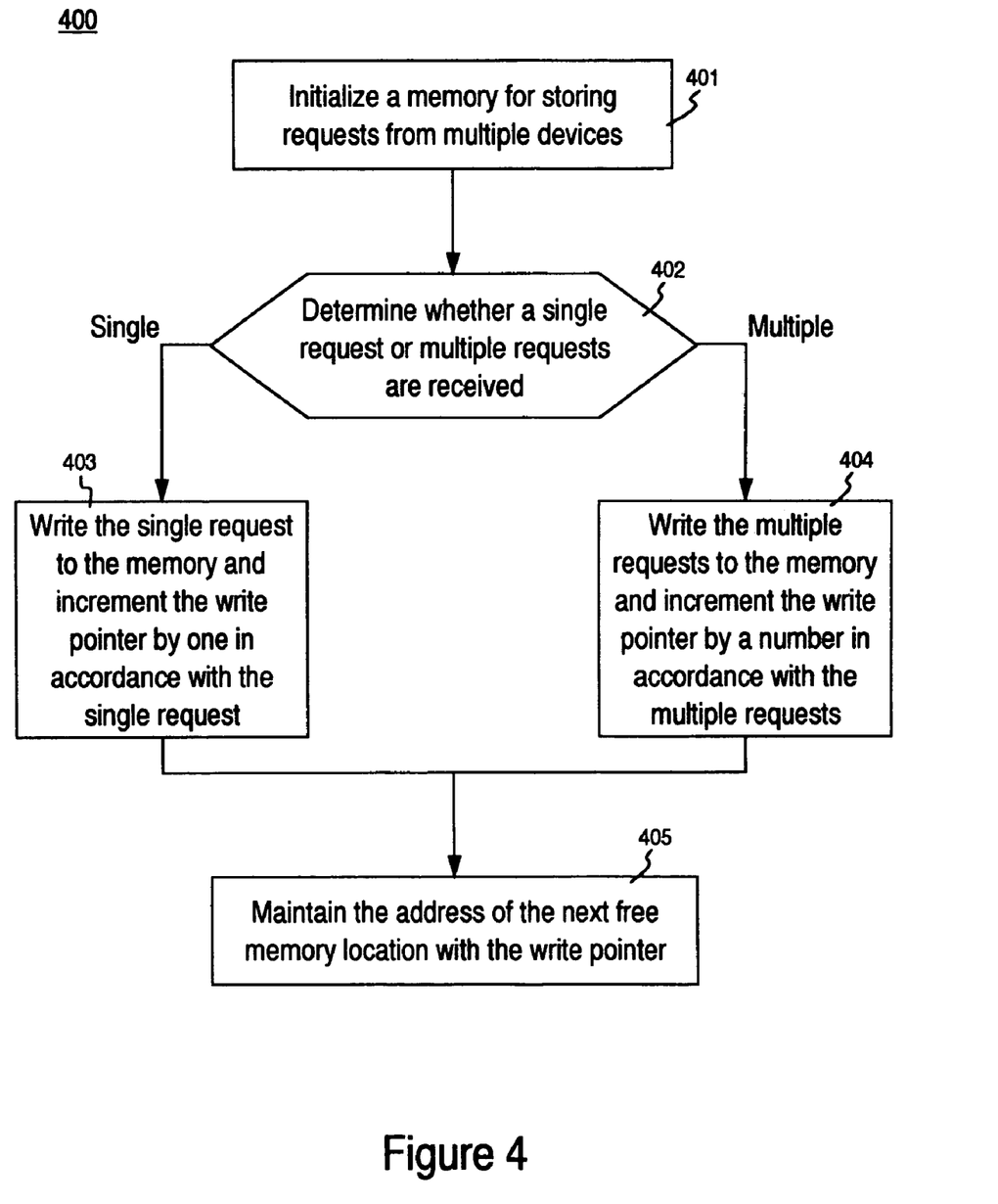
FIG. 4 shows a flow chart of the steps of a multiple request buffering process in accordance with one embodiment of the present invention.

Referring now to FIG. 4, a flowchart of the steps of a multiple request buffering process 400 in accordance with one embodiment of the present invention is shown. Process 400 shows the basic steps involved in managing a write pointer to control address locations of the memory used to store the request data.

Process 400 begins in step 401, wherein the buffer memory (e.g., memory 201 shown in FIG. 2) is initialized for storing requests from multiple devices. In step 402, when request(s) are received, a determination is made whether a single request or multiple requests are received. If a single request is received, process 400 proceeds to step 403. If multiple requests are received, process 400 proceeds to step 404. In step 403, in response to a single request, the request is written to the memory in accordance with the address indicated by the write pointer. The write pointer is subsequently incremented by one, in accordance with the single request. Subsequently, in step 405, the address of the next free location in the buffer memory is located in accordance with the write pointer. In step 404, in response to multiple requests being received, the multiple requests are written to the memory in parallel and in accordance with the write pointer. As the multiple requests are written, the write pointer is incremented in accordance there with. For example, if two requests are received, the write pointer is incremented by two. Subsequently, in step 405, the address of the next free location in the buffer memory is located in accordance with the write pointer.

Figure 5:
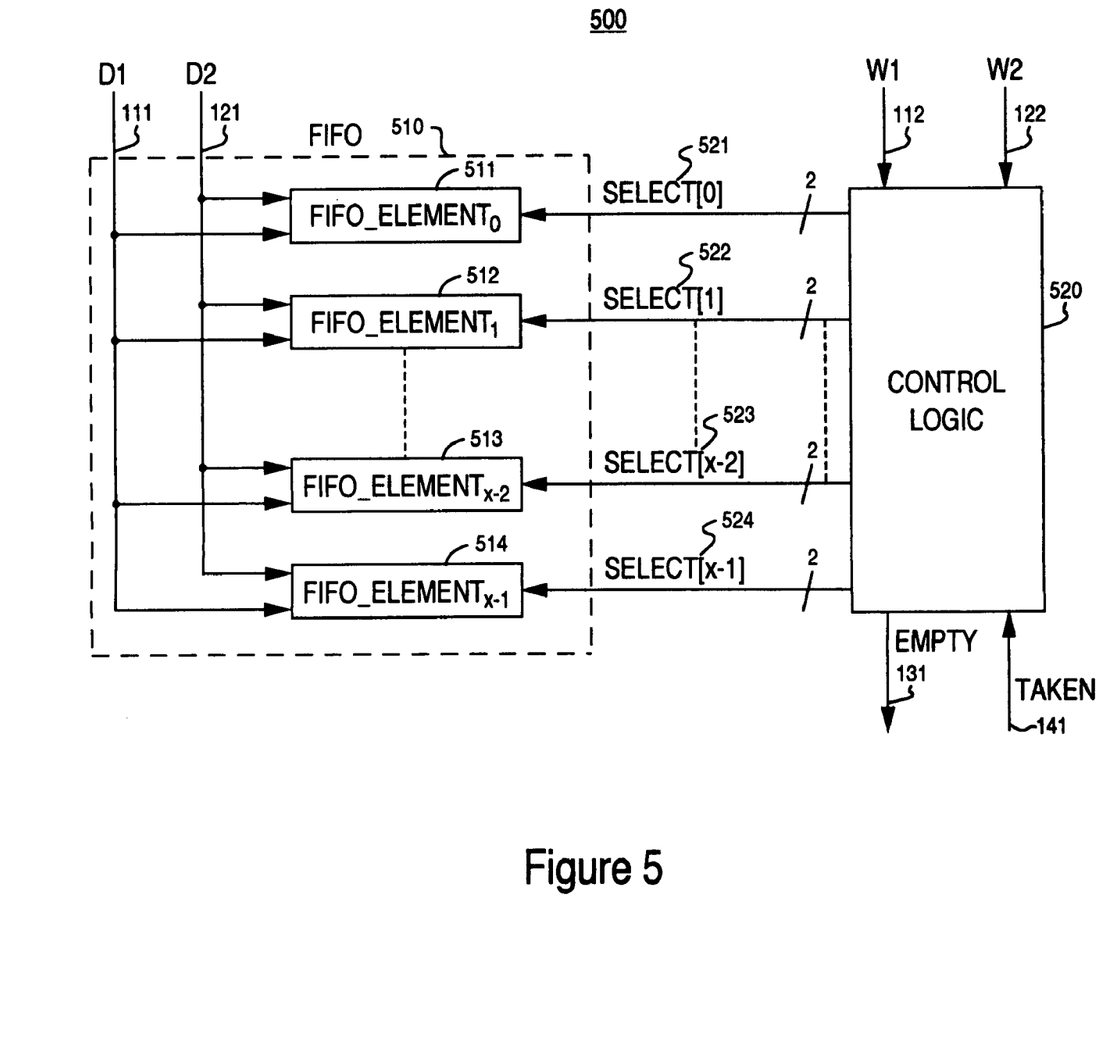
FIG. 5 shows a second implementation of the multiple request buffering logic and buffer memory shown in FIG. 1.

FIG. 5 shows a system 500 in accordance with a second embodiment of the present invention. System 500 utilizes a FIFO structure 510 implemented with a plurality of FIFO elements 511–514, as opposed to a multi-port RAM integrated circuit as used in system 200 of FIG. 2.

Figure 6:
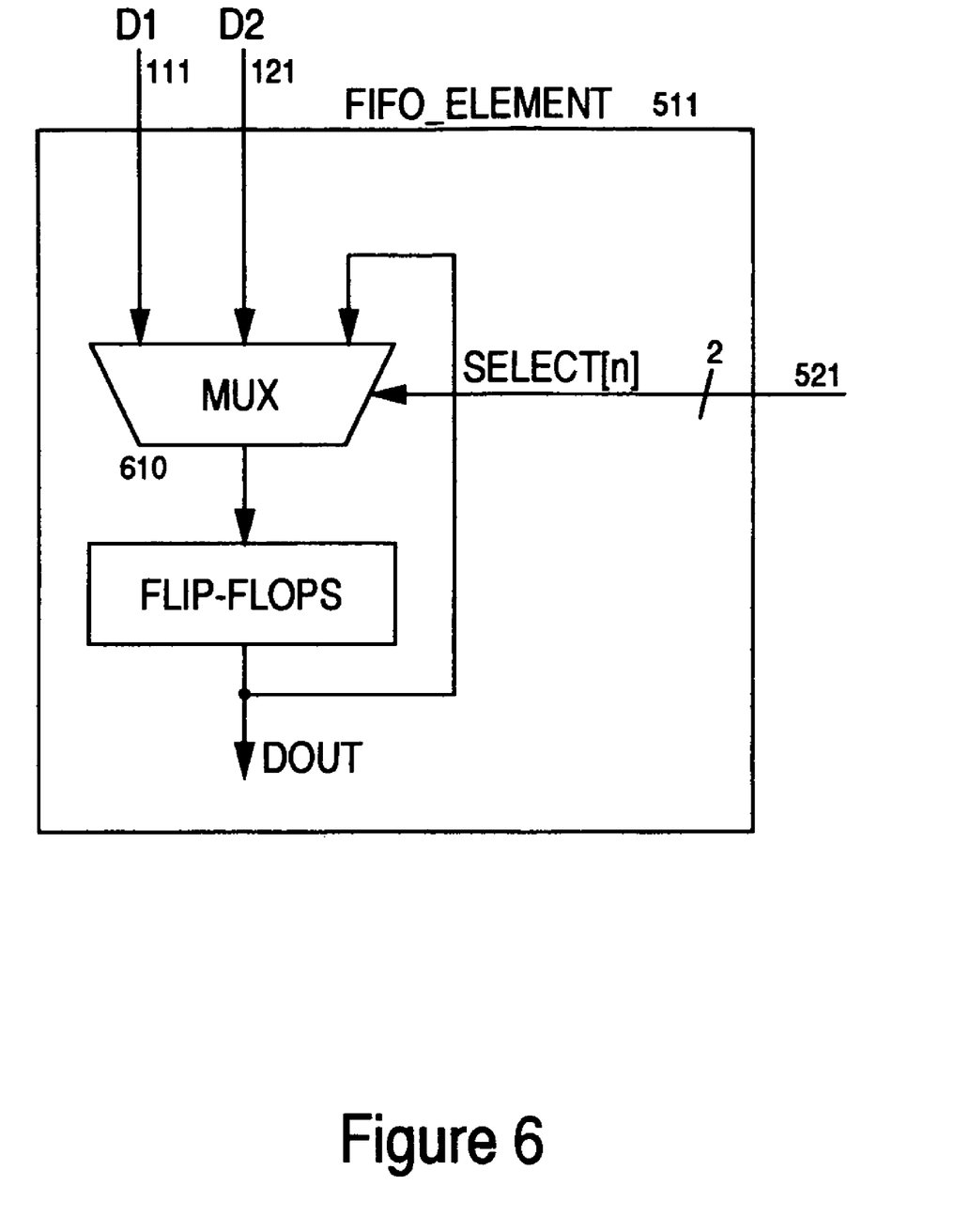
FIG. 6 shows the components of a FIFO element in accordance with one embodiment of the present invention.

In the present embodiment, the FIFO elements 511–514 are implemented using conventional flip-flops, wherein each element of each of the FIFO elements 511–514 utilizes multiplexing to select which data word will be written to each location (shown in FIG. 6). In this embodiment, the SELECT signals 521–524 are each 2 bits. For example, in the present embodiment, 00 selects D1, 01 selects D2, and 11 selects DOUT (which effectively preserves the original data). System 500 implements two write ports coupled to the two request inputs D1 111 and D2 121. Each of the FIFO elements 511–514 is coupled to the two request inputs 501–502.

FIG. 6 shows the components of one of the FIFO elements 511–514 in accordance with one embodiment of the present invention. In this case, FIG. 6 shows the components of FIFO element 511. As described above, the FIFO elements 511–514 each utilize multiplexing to select which data word will be written to each location. Accordingly, the 2-bit select line 521 couples to a multiplexer 610. The inputs of the multiplexer 610 are inputs D1 and D2, and DOUT. The particular input is selected via the 2-bit select signal, for example, where 00 selects D1, 01 selects D2, and 11 selects DOUT (which effectively preserves the original data).

Figure 7:
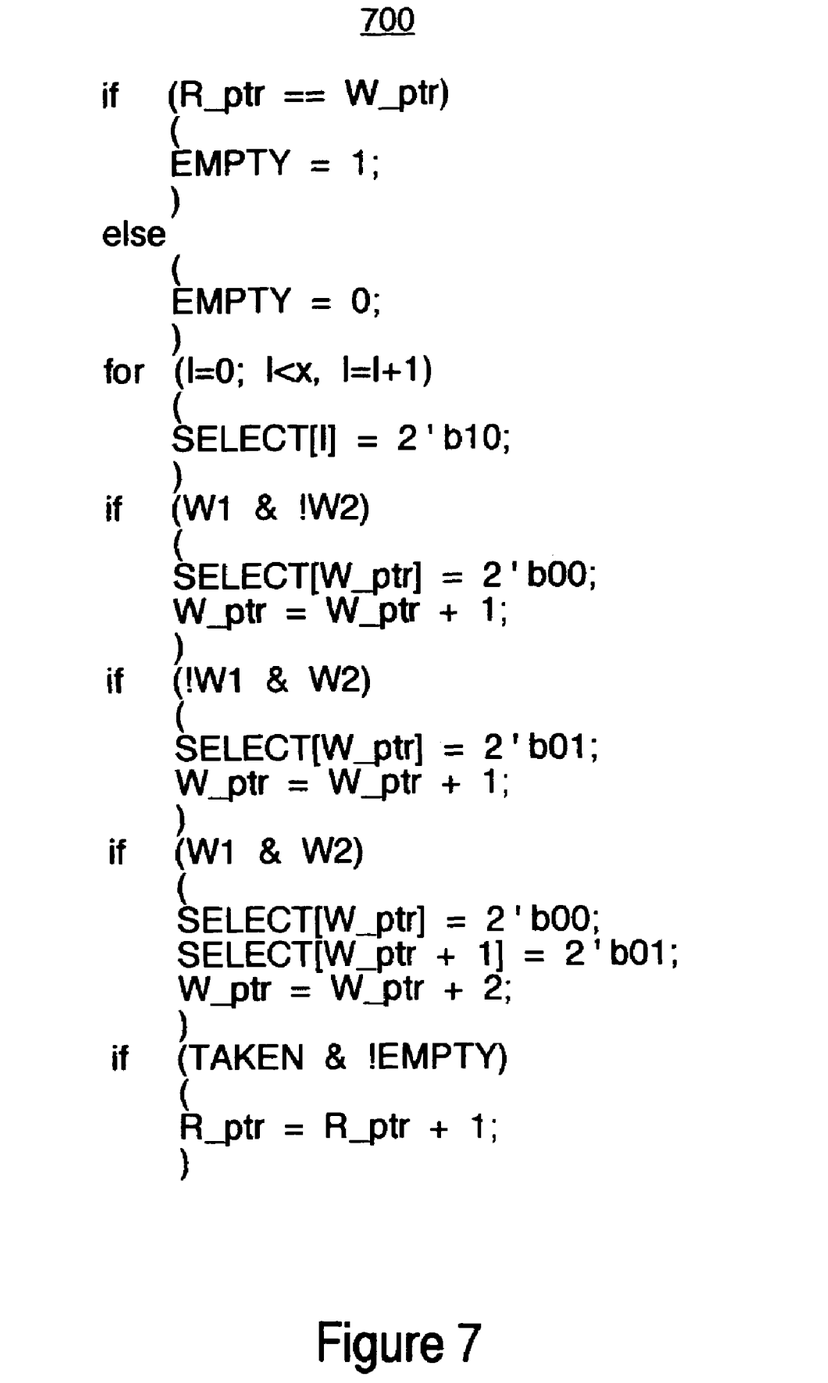
FIG. 7 shows a pseudo-code representation of the multiple request buffering process as implemented by the control logic of the system of FIG. 5.

FIG. 7 shows a pseudo-code representation 700 of a multiple request buffering process as implemented by the control logic 520 of system 500. As described above, the particular input is selected via the 2-bit select signal, for example, where 00 selects D1, 01 selects D2, and 11 selects DOUT (which preserves the original data). As with the pseudo-code representation 300 of FIG. 3, when two requests are received simultaneously, the write pointer is incremented accordingly (e.g., by two).

Thus, a method and system for buffering multiple requests from multiple devices to a buffer memory in a single clock cycle has been described. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application, thereby to enable others skilled in the art best to use the invention and various embodiments with various modifications as are suited to the particular use contemplated. It is intended that the scope of the invention be defined by the claims appended hereto and their equivalents.

What is claimed is:

1. A shared resource interface system, comprising:
   a shared processing unit;
   a first device requiring access to the shared processing unit via a first request for access to the shared processing unit;
   a second device requiring access to the shared processing unit via a second request for access to the shared processing unit;
   memory coupled to the shared processing unit and having a first and second write port;
   first request input coupled to the first write port and the first device and operable to receive the first request for access to the shared processing unit from the first device;
   second request input coupled to the second write port and the second device and operable to receive the second request for access to the shared processing unit from the second device;
   controller coupled to the memory, the first and second devices, and the shared processing unit, the controller being configured to control the memory to store the first request for access to the shared processing unit into the memory via the first write port and the second request for access to the shared processing unit into the memory via the second write port in one same clock cycle, wherein the first and second request are received by the memory via the first and second request input, wherein stalls corresponding to the second device waiting for the first device to submit the first request before the second device submits the second request are minimized.

2. The system of claim 1 further comprising:
   a first write address input coupled to the memory; and
   a second write address input coupled to the memory, wherein the controller is configured to control the first write address input and the second write address input to store the first request and the second request into the memory.

3. The system of claim 2 wherein the controller maintains a write address pointer for controlling the first write address input and the second write address input to coordinate the storing of the first request and the second request into the memory.

4. The system of claim 3 further comprising:
a first write address enable coupled to the memory; and
a second write address enable coupled to the memory, wherein the controller is configured to control the first write address enable and the second write address enable in conjunction with the first address input and the second write address input to store the first request and the second request into the memory.

5. The system of claim 1 wherein the memory is implemented using a multiple write-port RAM integrated circuit.

6. The system of claim 1 wherein the memory is implemented using a multiple write-port FIFO comprising a plurality of FIFO storage elements.

7. A shared resource interface system, comprising:
a shared processing unit;
a first device requiring access to the shared processing unit via a first request for access to the shared processing unit;
a second device requiring access to the shared processing unit via a second request for access to the shared processing unit;
buffer memory having multiple write ports and coupled to the shared processing unit;
first request input coupled to the multiple write ports and the first device and operable to receive the first request for access to the shared processing unit from the first device;
second request input coupled to the multiple write ports and the second device and operable to receive the second request for access to the shared processing unit from the second device;
multiplexer coupled to each of the multiple write ports, the multiplexer configured to control whether the first request input for access to the shared processing unit or the second request input for access to the shared processing unit is coupled to a respective write port; and
controller coupled to the buffer memory, the first and second devices, and the shared processing unit, the controller being configured to control the multiple write ports by maintaining a write address pointer for controlling a first write address input and a second write address input which coordinate the storing of the first and second request for access to the shared processing unit into the buffer memory in a single same clock cycle, wherein the first and second request each respectively include a first and second write operation, the first and second write operation respectively stored into the buffer memory via the multiple write ports, wherein stalls corresponding to the second device waiting for the first device to submit the first request before the second device submits the second request are minimized.

8. The system of claim 7 further comprising:
a first write address enable coupled to the buffer memory; and
a second write address enable coupled to the buffer memory, wherein the controller is configured to control the first write address enable and the second write address enable in conjunction with the first write address input and the second write address input to store the first request and the second request into the buffer memory.

9. The system of claim 7 wherein the controller is configured to control the multiplexer coupled to each of the multiple write ports.

10. The system of claim 7 wherein the buffer memory is implemented using a RAM integrated circuit.

11. The system of claim 7 wherein the buffer memory is implemented using a plurality of storage elements.

12. The system of claim 11 wherein the storage elements are flip-flops.

13. A shared resource interface method, comprising:
initializing a memory for storing requests for access to a shared processing unit from multiple devices;
determining whether a single request for access to the shared processing unit from a single device is received or multiple requests for access to the shared processing unit from multiple devices are received;
in response to receiving the single request, writing the single request for access to the shared processing unit to the memory and incrementing a write pointer in accordance with the single request; and
in response to receiving the multiple requests, writing the multiple requests for access to the shared processing unit to the memory and incrementing the write pointer in accordance with the multiple requests, the multiple requests written to the memory in a single same clock cycle, wherein stalls corresponding to one of the multiple devices waiting for another of the multiple devices to submit its respective request before the one device submits its respective request are minimized.

14. The method of claim 13 further comprising:
changing a memory address for writing single request and the multiple requests into the memory in accordance with the write pointer.

15. The method of claim 13 wherein the write pointer is maintained by a controller coupled to the memory.

16. The method of claim 13 wherein each of the multiple devices is coupled to a respective write port of the memory.

17. A shared resource interface system, comprising:
a controller coupled to a memory, a shared processing unit, and multiple devices, the memory for storing requests for access to the shared processing unit from the multiple devices, the controller comprising:
means for accessing the memory;
means for determining whether a single request from a single device is received or multiple requests from the multiple devices are received;
means for writing the single request to the memory and incrementing a write pointer in accordance with the single request; and
means for writing the multiple requests to the memory and incrementing the write pointer in accordance with the multiple requests, the multiple requests written to the memory in a single same clock cycle, wherein stalls corresponding to one of the multiple devices waiting for another of the multiple devices to submit its respective request before the one device submits its respective request are minimized.

18. The system of claim 17 further comprising;
means for changing a memory address for writing the single request and the multiple requests into the memory in accordance with a write pointer.

19. The system of claim 18 wherein the write pointer is maintained by a controller coupled to the memory.

20. The system of claim 17 wherein each of the multiple devices is coupled to a respective write port of the memory.

21. The system of claim 17 wherein the system is implemented within a single ASIC.

22. A shared resource interface system, comprising:
a first component, wherein the first component is a shared processing unit;
a first device requiring access to the shared processing unit via a first request for access to the shared processing unit;
a second device requiring access to the shared processing unit via a second request for access to the shared processing unit;
a buffer memory having multiple write ports;
a first request input coupled to the multiple write ports;
a second request input coupled to the multiple write ports;
a multiplexer coupled to each of the multiple write ports, the multiplexer configured to control whether the first request input for access to the shared processing unit or the second request input for access to the shared processing unit is coupled to a respective write port; and
a second component, wherein the second component is a controller, wherein further the second component is coupled to the buffer memory and configured to control the multiple write ports by maintaining a write address pointer for controlling a first write address input and a second write address input which coordinate the storing of the first and second request for access to the shared processing unit into the buffer memory in a single same clock cycle, wherein further the first and second request each respectively include a first and second write operation, the first and second write operation respectively stored into the buffer memory via the multiple write ports, and wherein further stalls corresponding to the second device waiting for the first device to submit the first request before the second device submits the second request are minimized.

* * * * *